J. R. LONG.
PIPE REAMER.
APPLICATION FILED DEC. 15, 1911.
1,038,913.
Patented Sept. 17, 1912.
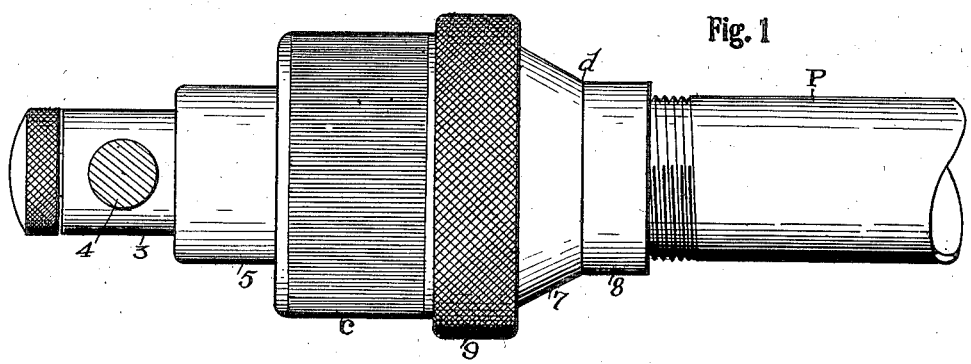
Fig. 1
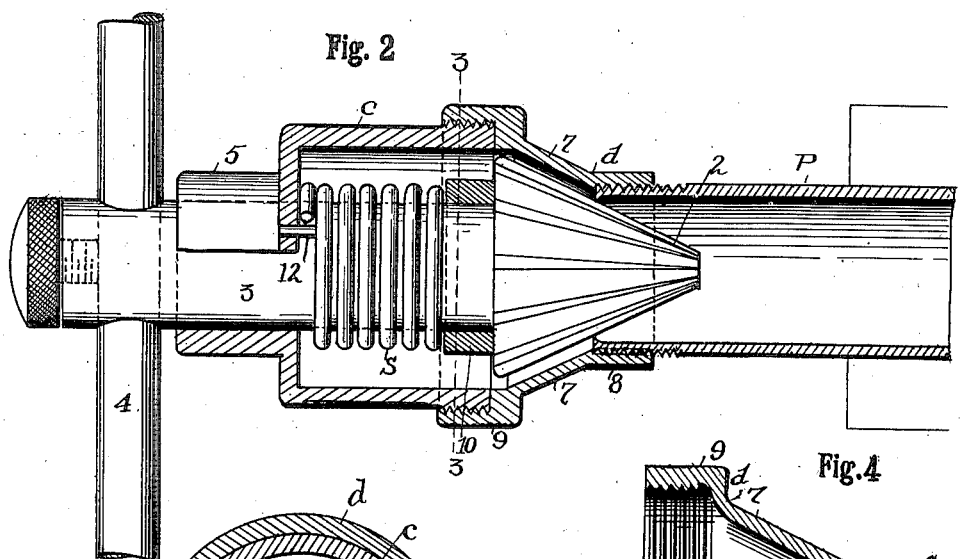
Fig. 2
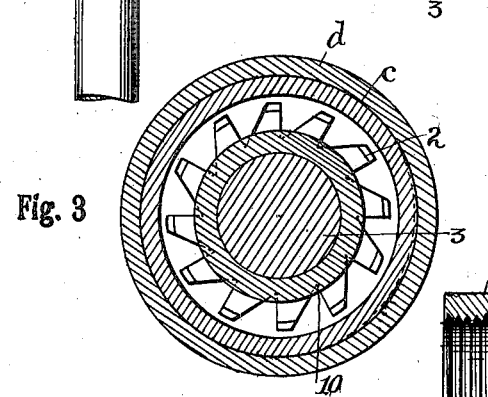
Fig. 3
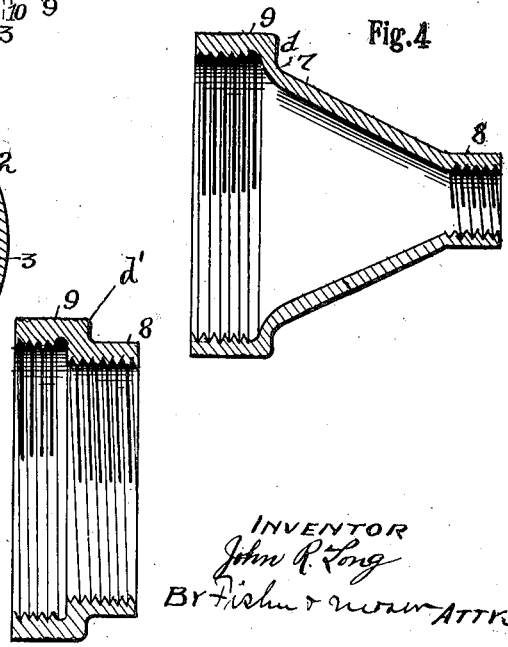
Fig. 4
Fig. 5
ATTEST
INVENTOR
John R. Long
By Fisher & _____ ATTYS

UNITED STATES PATENT OFFICE.

JOHN R. LONG, OF EAST AKRON, OHIO.

PIPE-REAMER.

1,038,913. Specification of Letters Patent. Patented Sept. 17, 1912.

Application filed December 15, 1911. Serial No. 666,051.

*To all whom it may concern:*

Be it known that I, JOHN R. LONG, citizen of the United States, residing at East Akron, in the county of Summit and State of Ohio, have invented certain new and useful Improvements in Pipe-Reamers, of which the following is a specification.

This invention has reference to pipe reamers, and the invention consists in the simple mechanism shown and which is bodily attachable to the pipe to be reamed, all substantially as herein set forth and particularly pointed out in the claims.

In the accompanying drawings, Figure 1 is a side elevation of the invention and of a pipe therewith, and Fig. 2 is a longitudinal section of Fig. 1. Fig. 3 is a cross section on line 3—3, Fig. 2. Fig. 4 is a sectional elevation of the coupling member of the reamer casing, and Fig. 5 a view of another or alternate form of coupling member adapted to a larger size of pipe.

The elements in the foregoing organization consist in a reamer or reaming tool 2 of the usual conical shape and provided with cutting teeth lengthwise on its surface, and the said head has a cylindrical shank 3 which is constructed in this instance with a transverse hole adapted to receive an operating lever or handle 4. The said tool and its shank or stem are mounted in a casing $c$, which has a reduced tubular extension 5 corresponding to the size of the shank 3 and supporting the same, and the surface of the body of the said casing is preferably milled for convenience of handling and screwing the parts together, especially in connecting the coupling member $d$ therewith. The said member $d$ has different diameters in any case whether adapted to couple up with one or another size of pipe, and as seen in Figs. 1, 2 and 3, the smaller diameter 8 which screws onto pipe P is offset from the larger diameter 9 which screws onto the casing $c$ by a tapered portion 7 which corresponds to the taper of tool 2 inside. The larger diameter 9 of said coupling also is milled as shown. The casing $c$ is screwed into the coupling $d$ to its limit and the coupling $d$ screwed on to pipe P for work.

The feed provided for tool 2 comprises a spring S which is wound about the shank 3 within casing $c$ and bears upon a band or collar 10 which lies against the head of the tool while the opposite end of the spring engages a pin 12 in casing $c$ and prevents the rotation of the spring when the tool is rotated.

In Fig. 5 I show one of several different sizes of couplings which can be used according to the size of the pipe, and in which case the two diameters 8 and 9 of the said coupling $d'$ are brought very near together and the engagement of the bur on the pipe will necessarily come up onto the larger diameter of the tool.

A further feature is the relation of handle 4 to or with the extension 5 of the casing. When the tool is not in use the said handle is forced against said extension by the spring S and this is the normal relation. But when the device is engaged on a pipe to be reamed the tool bears against the bur of the pipe and is forced back as the device is screwed on the pipe and which carries the handle 4 away from extension 5 about as seen in Fig. 2. This also puts spring S under working tension. Then as the tool is rotated to cut the bur the spring exerts the feeding pressure and the limit of the penetration of the tool in the pipe is fixed by handle 4 which then impinges against the extension 5 and the tool can go no farther.

The thrust or penetration of the tool is limited by the handle 4 and the tool itself is confined in casing $c$ by the handle even when the coupling $d$ is removed. The extension 5 has sufficient length to suport the tool horizontally in the casing apart from other help, and the parts are assembled by first placing the spring and collar 10 on the shank 3 and then projecting said shank through the casing and inserting the handle 4.

What I claim is:

1. A pipe reaming device having a body with a tubular bearing on its rear and a reducing coupling of two diameters detachably engaged thereon and threaded internally at both diameters, a tool having a shank projecting through the said bearing and a pressure coil about the said shank within said body adapted to press the tool forward in work, and a handle through said shank adapted to rotate the tool and to come against said bearing and limit the thrust of the tool forward beyond working limits.

2. A pipe reaming device comprising a body having a tubular extension of reduced cross section at its rear and threaded externally at its front and a coupling member screwed onto the front of said body and threaded in its smaller diameter, in combination with a reaming tool in said body having a shank extending through said extension, a collar on said shank at the base of said tool and a spring confined within said body coiled about said shank and bearing against said collar and a handle through said shank adapted to bear against said extension and limit the thrust of the tool forward under the action of said spring.

In testimony whereof I affix my signature in presence of two witnesses.

JOHN R. LONG.

Witnesses:
R. B. MOSER.
F. C. MUSSUN.